United States Patent
Kwon

(10) Patent No.: US 7,568,730 B2
(45) Date of Patent: Aug. 4, 2009

(54) PASSENGER AIR BAG MODULE

(75) Inventor: Hae Wook Kwon, Yongin-shi (KR)

(73) Assignee: Hyundai Mobis Co., Ltd., Yongin-shi (KR)

( * ) Notice: Subject to any disclaimer, the term of this patent is extended or adjusted under 35 U.S.C. 154(b) by 79 days.

(21) Appl. No.: 11/419,068

(22) Filed: May 18, 2006

(65) Prior Publication Data

US 2007/0138779 A1 Jun. 21, 2007

(30) Foreign Application Priority Data

Dec. 16, 2005 (KR) ........................ 10-2005-0124742

(51) Int. Cl.
*B60R 21/02* (2006.01)

(52) U.S. Cl. ................. 280/743.2; 280/728.2

(58) Field of Classification Search .............. 280/743.1, 280/728.2, 728.1, 743.2; *B60R 21/16*
See application file for complete search history.

(56) References Cited

U.S. PATENT DOCUMENTS 5,498,023 A * 3/1996 Adams et al. ............ 280/728.2
5,765,867 A * 6/1998 French ..................... 280/743.2
6,070,904 A * 6/2000 Ozaki et al. .............. 280/743.1
6,131,944 A * 10/2000 Henkel et al. ............ 280/728.3
6,371,510 B1 * 4/2002 Marriott et al. .......... 280/730.1
6,474,686 B1 * 11/2002 Higuchi et al. ........... 280/743.1
6,626,456 B2 * 9/2003 Terbu et al. .............. 280/728.2
6,942,242 B2 * 9/2005 Hawthorn et al. ........ 280/728.2
6,955,377 B2 * 10/2005 Cooper et al. ............ 280/743.1
7,213,837 B2 * 5/2007 Clarke et al. ................ 280/731
2003/0189319 A1 * 10/2003 Soderquist ............... 280/728.3
2005/0082800 A1 4/2005 Lim
2005/0082807 A1 4/2005 Kwon

OTHER PUBLICATIONS

U.S. Appl. No. 11/436,724 to Kwon, filed May 19, 2006.

* cited by examiner

*Primary Examiner*—John Q. Nguyen
*Assistant Examiner*—Timothy Wilhelm
(74) *Attorney, Agent, or Firm*—Greenblum & Bernstein, P.L.C.

(57) ABSTRACT

A passenger air bag module includes an air bag cushion accommodated in an air bag housing and deploying toward an occupant when the collision of a vehicle occurs, and a cushion wrap including a reinforcing portion that protects the air bag cushion and a flap portion that suppresses initial deployment of the air bag cushion and keeps the air bag cushion in a folded condition.

13 Claims, 8 Drawing Sheets

[FIG 1]
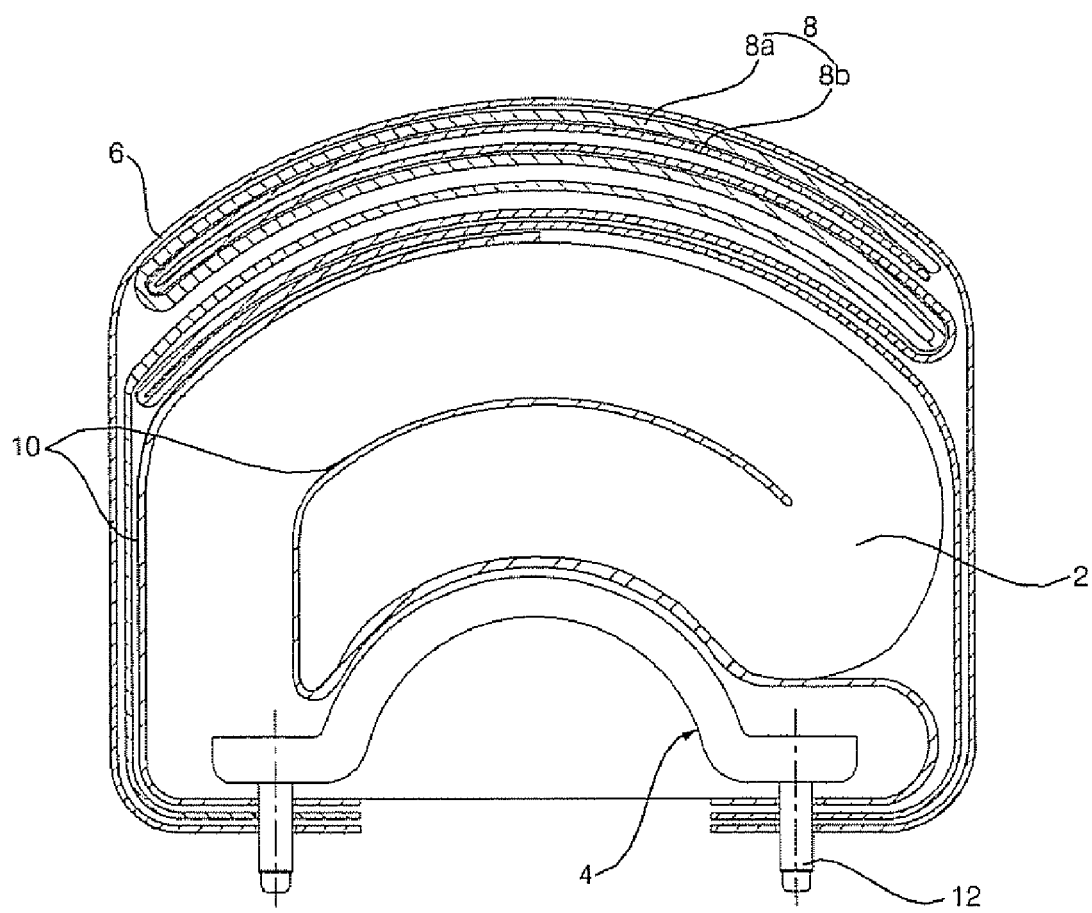

[ FIG 2 ]
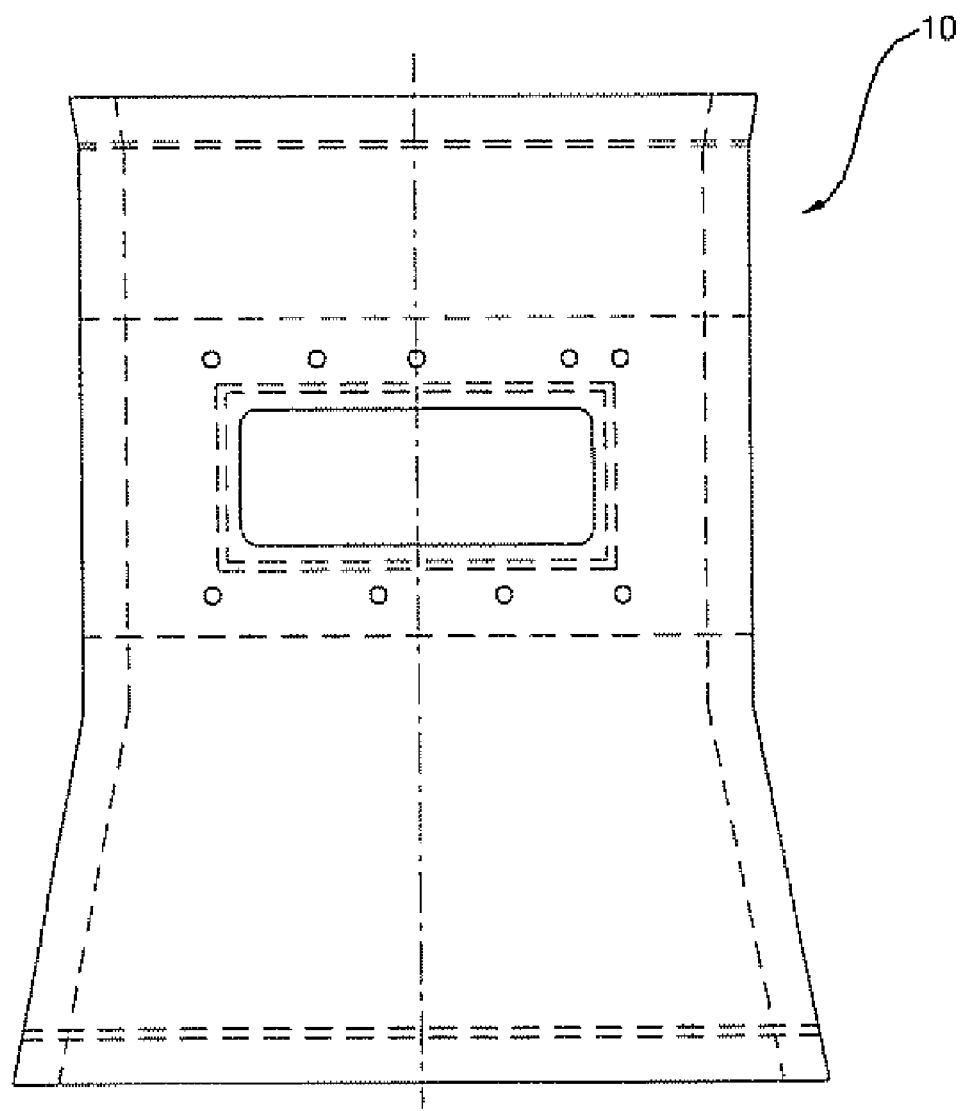

[FIG 3]
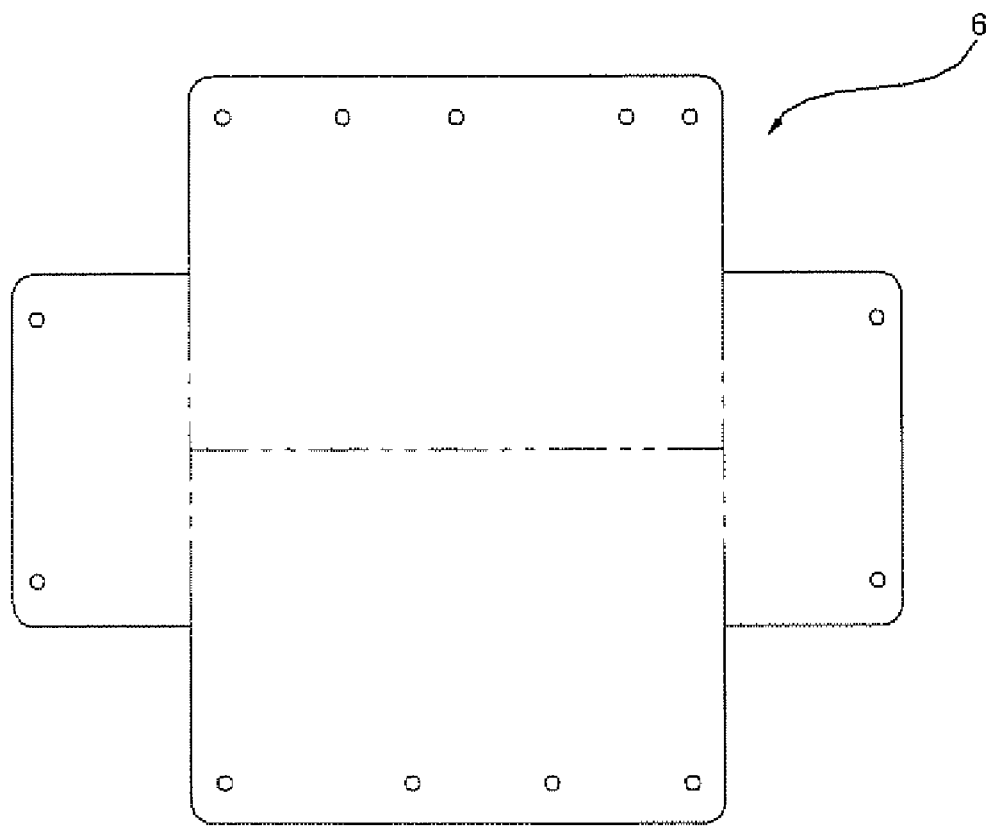

[ FIG 4 ]
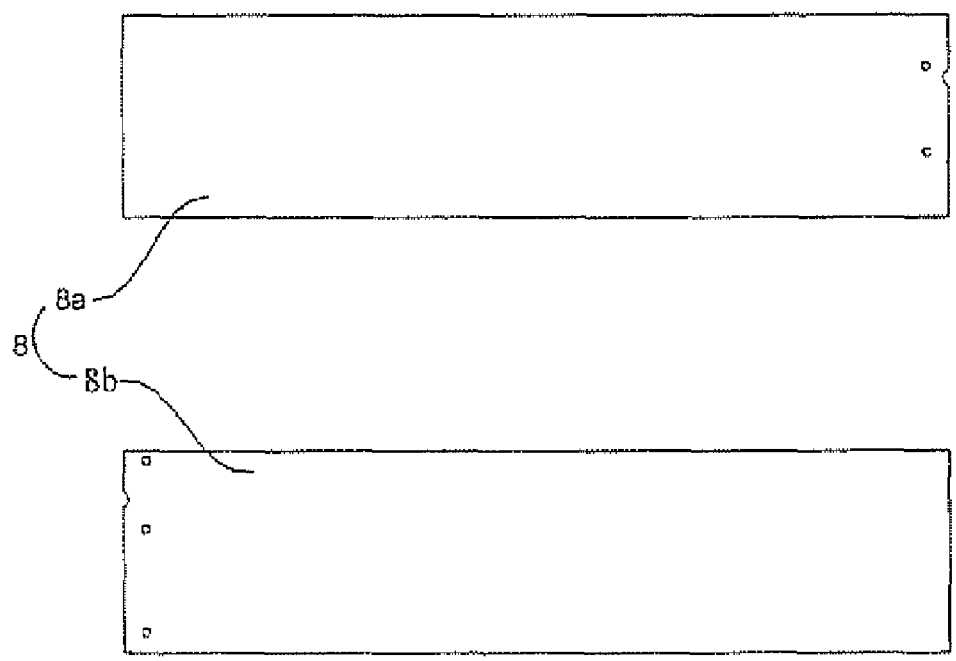

[FIG 5]
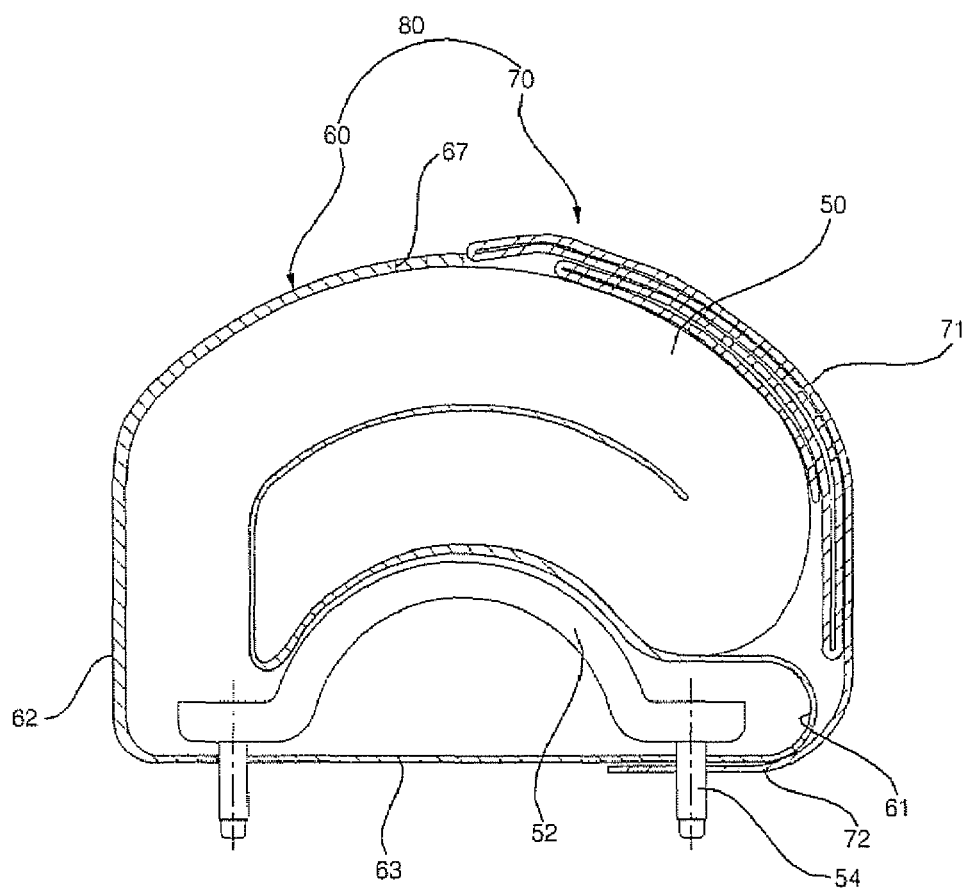

[ FIG 6 ]
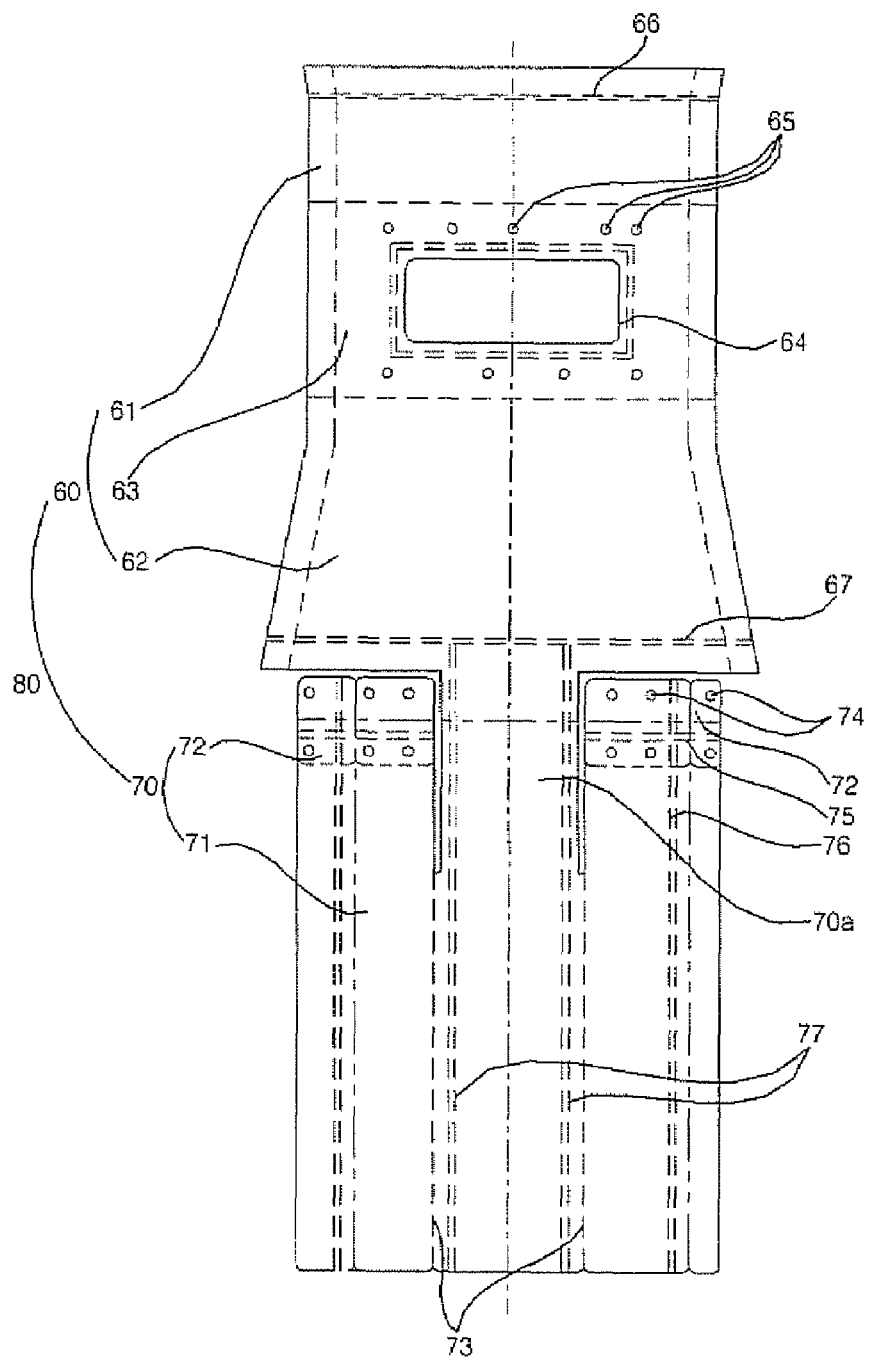

[ FIG 7a]
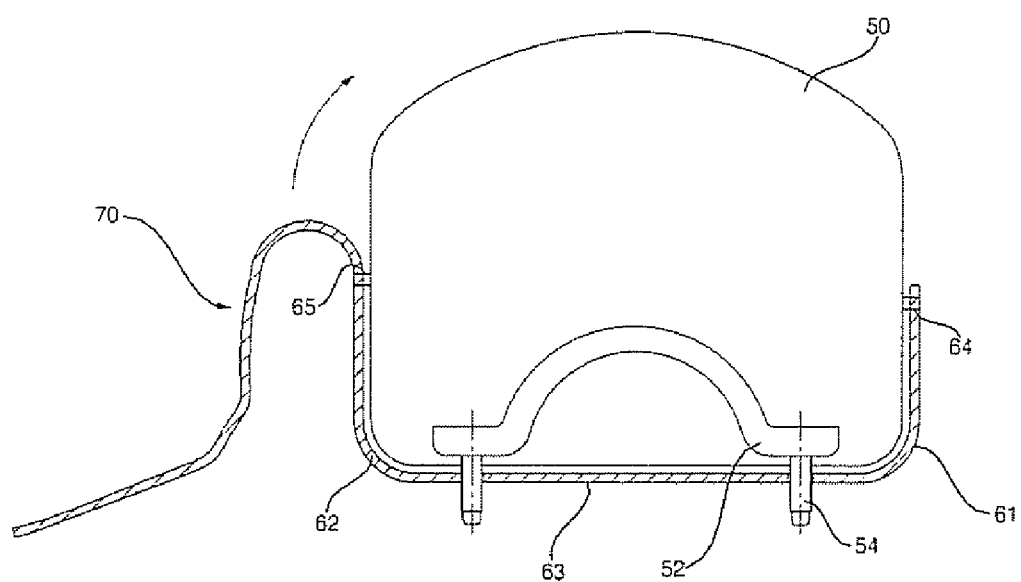

[ FIG 7b ]
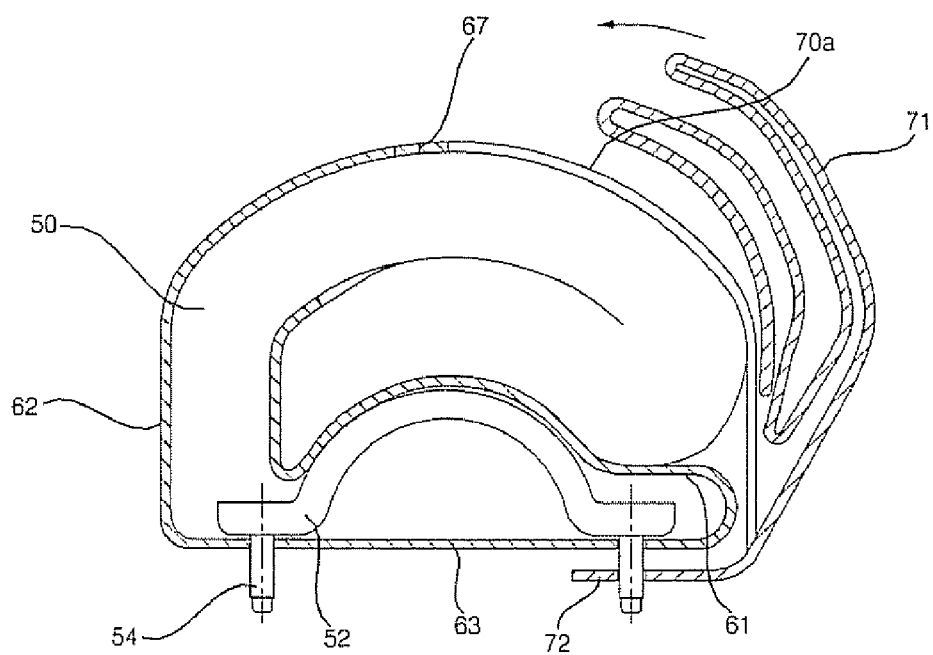

PASSENGER AIR BAG MODULE

This Nonprovisional application claims priority under 35 U.S.C. § 119(a) on Patent Application No. 10-2005-0124742 filed in Korea on Dec. 16, 2005, the entire contents of which are hereby incorporated by reference.

BACKGROUND OF THE INVENTION

1. Field of the Invention

The present invention relates to a passenger air bag module, and more particularly, to a passenger air bag module, which is easy to assemble, lightweight and can reduce costs because the number of parts is decreased by having a cushion wrap formed integral with a flap portion and reinforcing portion.

2. Description of the Background Art

Generally, an air bag for vehicles may be classified into a driver air bag (DAB) which is mounted to a handle for protecting the driver in a driver's seat and a passenger air bag (PAB) which is mounted to an instrument panel in front of a passenger's seat for protecting the passenger in a passenger's seat. Basically, the driver air bag is requisite, and the passenger air bag is optional; however, vehicles with passenger air bags basically mounted therein for protecting passengers from injury are on the increase in recent years.

FIG. 1 is a cross sectional view of a passenger air bag module according to the conventional art. FIG. 2 is an expanded view of a reinforcing cloth according to the conventional art. FIG. 3 is an expanded view of a cushion wrap according to the conventional art. FIG. 4 is an expanded view of a flap according to the conventional art.

The air bag module according to the conventional art comprises an air bag housing (not shown) mounted to an instrument panel (not shown) opposite to a passenger seat, an air bag cushion 2 accommodated in the air bag housing so as to be deployed toward a passenger seat when a collision of the vehicle occurs, and an inflator (not shown) supplying a high pressure gas to the air bag cushion 2.

As shown in FIG. 1, a retainer 4 coupled to the air bag cushion 2 for securing the air bag cushion 2 is mounted inside the air bag housing.

Additionally, the passenger air bag module further comprises a cushion wrap 6 for wrapping the air bag cushion 2 so as to maintain the air bag cushion 2 in a folded condition, a flap 8 installed to be foldable inside the cushion wrap 6 while wrapping the air bag cushion 2 such that a deployment pressure is absorbed upon deployment of the air bag cushion 2, and a reinforcing cloth 10 installed so as to wrap parts of the air bag cushion 2 for protecting the air bag cushion 2 from damaged by a high temperature, high pressure gas supplied from the inflator (not shown).

The cushion wrap 6, flap 8 and reinforcing cloth 10 are coupled to studs 12 provided at the retainer 4.

The flap 8 is used for improving OOP (out of position) performance, which is generally called an OPF (occupant protecting flap).

The flap 8 serves to protect an out-of-position occupant by not allowing the air bag cushion 2 to be aggressively deployed toward the occupant by reducing an initial deployment pressure upon deployment of the air bag cushion 2.

The flap 8 consists of a first flap 8a secured to one side the retainer 4 and a second flap 8b secured to the other side of the retainer 4. The first flap 8a and the second flap 8b are folded to be overlap each other.

In addition, the first and second flaps 8a and 8b are coated with silicon so as to have a sufficient frictional force therebetween upon deployment of the air bag cushion 2.

However, the passenger air bag module according to the conventional art has a problem that the number of parts increases and the cost is high because the flap 8, the cushion wrap 6 and reinforcing cloth 10 must be installed respectively. Besides, since the flap 8 is made of a silicon coated fabric, the cost is high.

SUMMARY OF THE INVENTION

The present invention is directed to Solve the prior art problems, and has for its object to provide a passenger air bag module which can maintain OOP performance, has a simple structure and can reduce costs.

To accomplish the above object, there is provided a passenger air bag module according to the present invention, comprising: an air bag cushion accommodated in an air bag housing and deploying toward an occupant when the collision of a vehicle occurs; and a cushion wrap including a reinforcing portion for protecting the air bag cushion and a flap portion for suppressing initial deployment of the air bag cushion and keeping the air bag cushion in a folded condition.

The flap portion has a tear line that is torn by the deployment pressure of the air bag cushion.

The cushion wrap is secured to the air bag housing by a retainer.

The flap portion consists of a folding portion being extended from the reinforcing portion and folded several times and a coupling portion formed at one side of the folding portion to be coupled to the retainer.

The folding portion is sewn after being folded.

The folding portion has a tear line that is torn by the deployment pressure of the air bag cushion.

The flap portion is formed such that the part coupled to the retainer forms at least one layer.

The reinforcing portion includes a coupling portion coupled to the retainer, a first reinforcing portion extended from one side of the coupling portion so as to wrap one side of the air bag cushion and a second reinforcing portion extended from the other side of the coupling portion so as to wrap the other side of the air bag cushion.

The flap portion is formed by being extended from any one side of the first and second reinforcing portions.

The coupling portion has coupling holes formed so as to be coupled to studs formed at the retainer.

BRIEF DESCRIPTION OF THE DRAWINGS

In the drawings:

FIG. 1 is a cross sectional view of a passenger air bag module according to the conventional art;

FIG. 2 is an expanded view of a reinforcing cloth according to the conventional art;

FIG. 3 is an expanded view of a cushion wrap according to the conventional art;

FIG. 4 is an expanded view of a flap according to the conventional art;

FIG. 5 is a cross sectional view of a passenger air bag module according to the present invention;

FIG. 6 is an expanded view of a cushion wrap according to the present invention;

FIGS. 7a and 7b are assembly state views illustrating a method of assembling a cushion wrap according to the present invention.

DETAILED DESCRIPTION OF THE PREFERRED EMBODIMENTS

Hereinafter, embodiments of the present invention will be described with reference to the accompanying drawings.

FIG. 5 is a cross sectional view of a passenger air bag module according to the present invention. FIG. 6 is an expanded view of a cushion wrap according to the present invention. FIGS. 7a and 7b are assembly state views illustrating a method of assembling a cushion wrap according to the present invention.

As shown in FIG. 5, the air bag module according to the present invention comprises an air bag cushion 50 accommodated in an air bag housing (not shown) so as to be deployed toward an occupant when a collision of the vehicle occurs and a cushion wrap 80 including a reinforcing portion 60 for protecting the air bag cushion 50 and a flap portion 70 for suppressing initial deployment of the air bag cushion 50 and keeping the air bag cushion 50 in a folded condition.

The air bag housing (not shown) is installed inside an instrument panel (not shown) opposite to a passenger seat. An inflator (not shown) for supplying a high temperature, high pressure gas to the air bag cushion 50 when a collision of the vehicle occurs is mounted to the air bag housing (not shown).

The air bag cushion 50 is secured to the air bag housing (not shown) by a retainer 52. The cushion wrap 80 is secured to the air bag housing (not shown) by the retainer 52.

The retainer 52 is provided integral with studs 54, and the air bag cushion 50 and the cushion wrap 80 are also coupled to the studs 54.

The cushion wrap 80 is made of one sheet of fabric, whose center is partially cut, and which is divided into the reinforcing portion 60 and the flap portion 70, centering on the cut part.

As shown in FIG. 6, the reinforcing portion 60 includes a first coupling portion 63 coupled to the retainer 52, a first reinforcing portion 61 extended from one side of the first coupling portion 63 so as to wrap one side of the air bag cushion 50 and a second reinforcing portion 62 extended from the other side of the first coupling portion 63 so as to wrap the other side of the air bag cushion 50.

The first coupling portion 63 has a gas supply hole 64 for supplying a high temperature, high pressure gas from the inflator (not shown).

A plurality of first coupling holes 65 is formed around the gas supply hole 64 so as to be coupled to the studs 54.

The first and second reinforcing portions 61 and 62 wrap the outside the air bag cushion 50 before the air bag cushion 50 is folded. When the air bag cushion 50 is folded, any of the first and second reinforcing portions 61 and 62 are folded together with the air bag cushion 50.

After wrapping the air bag cushion 50, the first and second reinforcing portions 61 and 62 are sewn to the air bag cushion 50 by a sewing thread.

As shown in FIG. 16, in this embodiment, the description is only made regarding the first reinforcing portion 61 being folded together with the air bag cushion 50 and the second reinforcing portion 62 protecting the air bag cushion 50 and wrapping the air bag cushion 50 so as to be maintained in a folded condition.

The flap portion 70 is formed by being extended from any one side of the first and second reinforcing portions 61 and 62.

Here, the description thereof is only made regarding the flap portion 70 being formed by being extended from the second reinforcing portion 62.

As shown in FIG. 6, the flap portion 70 consists of a folding portion 71 being extended from the second reinforcing portion 62 and folded several times and a second coupling portion 72 formed at one side of the folding portion 71 to be coupled to the retainer 52.

Additionally, the folding portion 71 of the flap portion 70 has a tear line 73 that is torn by the deployment pressure of the air bag cushion 50.

The tear line 73 is longitudinally formed along the length direction of the folding portion 71.

The second coupling portion 73 is formed of at least one layer such that the ends are folded.

That is, the second coupling portion 72 is folded once in the up-down direction and folded once in the left and right direction in FIG. 5, and sewn by a sewing thread after being folded.

The second coupling portion 72 has second coupling holes 74 formed so as to be coupled to the studs 54.

Reference numerals 66 and 67 denote a sewing line along which the first and second reinforcing portions 61 and 62 are sewn to the air bag cushion 50, respectively, and reference numerals 75 and 76 denote a sewing line along which the second coupling portion 72 is sewn after being folded.

A method of assembling the passenger air bag module thus-constructed according to the present invention will be described below.

Firstly, the cushion wrap 80 is coupled to the studs 54 of the retainer 52, and then the air bag cushion 50 is coupled to the retainer 52.

Next, as shown in FIG. 7a, one side of the air bag cushion 50 is wrapped by the first reinforcing portion 61 of the cushion wrap 80, the other side of the air bag cushion 50 is wrapped by the second reinforcing portion 62 thereof, and then the first and second reinforcing portions 61 and 62 are sewn to the air bag cushion 50.

Afterwards, when the air bag cushion 50 is folded, as shown in FIG. 7b, the first reinforcing portion 61 is folded together with the air bag cushion 50 and positioned between the folds of the air bag cushion 50, and as shown in FIG. 6, the second reinforcing portion 62 serves as a wrap for maintaining the air bag cushion 50 in a folded condition.

When the air bag cushion 50 is folded, the flap portion 70 of the cushion wrap 80 is turned to the left in FIG. 7b to wrap the air bag cushion 50.

Here, as shown in FIGS. 6 and 7b, a connection part 70a of the flap portion 70 that is cut and connected to the second reinforcing portion 61 wraps the air bag cushion 50.

Then, the coupling portion 72 of the flap portion 70 is coupled to the stud of the retainer 52.

Afterwards, the folding portion 71 of the flap portion 70 is folded several times and sewn by a sewing thread. As the folds and the connection part 70a are sewn together, the folding portion 71 is tightly contacted with the air bag cushion 50 to thus wrap the air bag cushion 50.

Reference numeral 77 denotes a sewing line along which the folding portion 71 is sewn.

That is, as shown in FIG. 5, one side of the air bag cushion 50 is wrapped by the second reinforcing portion 62, and the other side of the air bag cushion is wrapped by the flap portion 70.

Therefore, in the cushion wrap 80, the second reinforcing portion 62 and the flap portion 70 serve to wrap the air bag cushion 50 in a folded condition.

The operation of the passenger air bag module thus-constructed according to the present invention will be described below.

When a collision of the vehicle occurs, a high pressure gas is supplied from the inflator (not shown) to the air bag cushion 50.

At this point, the air bag cushion 50 is prevented from being damaged by a high temperature, high pressure gas because the first and second reinforcing portions 61 and 62 are attached thereto.

As the air bag cushion 50 is charged with the gas, the air bag cushion 50 is inflated and deployed, and the tear line 73 is torn by the deployment pressure of the air bag cushion 50.

At this point, since the deployment energy of the air bag cushion 50 is absorbed as the tear line 73 is torn, this prevents the air bag cushion 50 from being aggressively deployed toward the occupant, thereby minimizing damage to an out-of-position (OOP) occupant.

Therefore, the flap portion 70 of the cushion wrap 80 serves as an OPF (occupant protection flap) for minimizing damage of the occupant upon deployment of the air bag cushion 50.

When the tear line 73 is torn, sewn parts of the folding portion 71 are deployed along with the second reinforcing portion 62, and the other parts are deployed to the opposite side because the second coupling portion 72 is secured to the retainer 52.

Subsequently, the cushion wrap 80 serves to maintain the air bag cushion 50 in a folded condition, as well as to protect the air bag cushion 50 from a high temperature, high pressure gas and minimize damage to the occupant upon deployment of the air bag cushion 50.

The passenger air bag module thus-constructed according to the present invention is easy to assemble, lightweight and can reduce costs because the number of parts is decreased by having a cushion wrap formed integral with a flap portion and reinforcing portion.

Furthermore, the flap portion absorbs parts of the deployment energy of an air bag cushion by having a tear line, thus minimizing injury to a passenger and improving OOP performance. Besides, the flap portion does not require a silicon coating process, thereby reducing the costs.

Furthermore, the flap portion is formed such that the part coupled to the retainer can form at least one layer, thereby improving the intensity of the part coupled to the retainer.

What is claimed is:

1. A passenger air bag module, comprising:
    an air bag cushion accommodated in an air bag housing and deployable toward an occupant when the collision of a vehicle occurs; and
    a cushion wrap including a reinforcing portion that protects the air bag cushion and includes a first coupling portion, a flap portion that suppresses initial deployment of the air bag cushion and retains the air bag cushion in a folded condition, and a connection part extending from a central end portion of the reinforcing portion,
    wherein the flap portion includes a second coupling portion configured to be provided on opposite sides of the connection part when the air bag cushion is expanded,
    the flap portion, the reinforcing portion and the connection part are formed unitarily and in one piece,
    the flap portion is provided at each lateral side of the connection part, and
    a tear line configured to couple the flap portion to the connection part, the tear line being provided between the flap portion and the connection part.

2. The passenger air bag module of claim 1, wherein the flap portion has a tear line that is torn by the deployment pressure of the air bag cushion.

3. The passenger air bag module of claim 1, wherein the cushion wrap is secured to the air bag housing by a retainer.

4. The passenger air bag module of claim 3, wherein the flap portion comprises a folding portion extending from the reinforcing portion and folded several times and a coupling portion formed at one side of the folding portion to be coupled to the retainer.

5. The passenger air bag module of claim 4, wherein the folding portion is sewn after being folded.

6. The passenger air bag module of claim 4, wherein the folding portion has a tear line that is torn by the deployment pressure of the air bag cushion.

7. The passenger air bag module of claim 3, wherein the flap portion is formed such that the part coupled to the retainer forms at least one layer.

8. The passenger air bag module of claim 2, wherein the reinforcing portion comprises a coupling portion coupled to the retainer, a first reinforcing portion extending from one side of the coupling portion so as to wrap one side of the air bag cushion and a second reinforcing portion extending from the other side of the coupling portion so as to wrap the other side of the air bag cushion.

9. The passenger air bag module of claim 8, wherein the flap portion is formed by extending from any one side of the first and second reinforcing portions.

10. The passenger air bag module of claim 8, wherein the coupling portion has coupling holes formed so as to be coupled to studs formed at the retainer.

11. The passenger air bag module of claim 3, wherein the reinforcing portion comprises a coupling portion coupled to the retainer, a first reinforcing portion extending from one side of the coupling portion so as to wrap one side of the air bag cushion and a second reinforcing portion extending from the other side of the coupling portion so as to wrap the other side of the air bag cushion.

12. The passenger air bag module of claim 11, wherein the flap portion is formed by extending from any one side of the first and second reinforcing portions.

13. The passenger air bag module of claim 11, wherein the coupling portion has coupling holes formed so as to be coupled to studs formed at the retainer.

* * * * *